US010085122B2

(12) United States Patent
Howe et al.

(10) Patent No.: US 10,085,122 B2
(45) Date of Patent: Sep. 25, 2018

(54) SYSTEMS AND METHODS FOR DETERMINING DEVICE LOCATION USING WIRELESS DATA AND OTHER GEOGRAPHICAL LOCATION DATA

(71) Applicant: MasterCard International Incorporated, Purchase, NY (US)

(72) Inventors: Justin Howe, San Francisco, CA (US); Bruce William MacNair, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/632,070

(22) Filed: Jun. 23, 2017

(65) Prior Publication Data

US 2017/0295470 A1     Oct. 12, 2017

Related U.S. Application Data

(63) Continuation of application No. 14/789,752, filed on Jul. 1, 2015, now Pat. No. 9,693,202.

(51) Int. Cl.
*H04W 24/00* (2009.01)
*H04W 4/04* (2009.01)
(Continued)

(52) U.S. Cl.
CPC .............. *H04W 4/04* (2013.01); *H04W 24/10* (2013.01); *H04W 64/00* (2013.01); *G06Q 20/20* (2013.01); *G06Q 20/322* (2013.01); *H04B 17/318* (2015.01)

(58) Field of Classification Search
CPC ..................................................... H04W 4/02
(Continued)

(56) References Cited

U.S. PATENT DOCUMENTS 6,259,406 B1    7/2001  Sugiura et al.
8,417,221 B2    4/2013  Shaw
                        (Continued)

FOREIGN PATENT DOCUMENTS

JP         2044929 A      8/1990
JP         7231473 A      8/1995
                (Continued)

OTHER PUBLICATIONS

PCT Search Report and Written Opinion, Application No. PCT/US2016/038001, dated Sep. 27, 2016, 8 pp.

*Primary Examiner* — Chuck Huynh
(74) *Attorney, Agent, or Firm* — Armstrong Teasdale LLP

(57) ABSTRACT

A computer-implemented method for determining device location of a user device within a venue using a wireless positioning system is provided. The method includes identifying a plurality of signal sample sets, wherein each signal sample set includes a sample location within the venue and one or more wireless signal strengths of associated wireless access points positioned at the venue, wherein the sample location is determined based on location data associated with a corresponding payment card transaction within the venue. The method also includes receiving a subject wireless signal strength sample of the wireless access points captured by the user device at an unidentified location within the venue. The method further includes determining a subject location of the user device based on the plurality of signal sample sets and the one or more subject wireless signal strength samples, and providing the subject location of the user device within the venue.

21 Claims, 8 Drawing Sheets

(51) Int. Cl.
  *H04W 24/10* (2009.01)
  *H04W 64/00* (2009.01)
  *H04B 17/318* (2015.01)
  *G06Q 20/20* (2012.01)
  *G06Q 20/32* (2012.01)

(58) Field of Classification Search
  USPC ............................. 455/456.2, 456.3, 456.1
  See application file for complete search history.

(56) References Cited

U.S. PATENT DOCUMENTS

| | | | |
|---|---|---|---|
| 8,725,119 | B2 | 5/2014 | Shaw |
| 8,738,034 | B2 | 5/2014 | Leclercq et al. |
| 8,970,430 | B2 | 3/2015 | Chen |
| 2006/0085419 | A1 | 4/2006 | Rosen |
| 2006/0176849 | A1 | 8/2006 | Gass |
| 2011/0093340 | A1 | 4/2011 | Kramer et al. |
| 2012/0149415 | A1 | 6/2012 | Valaee et al. |
| 2013/0217332 | A1 | 8/2013 | Altman et al. |
| 2013/0217410 | A1* | 8/2013 | Ku .................. H04W 4/008 455/456.1 |
| 2013/0282490 | A1 | 10/2013 | Kramer et al. |
| 2013/0290119 | A1 | 10/2013 | Howe et al. |
| 2013/0304536 | A1 | 11/2013 | Hamachi |
| 2014/0108108 | A1 | 4/2014 | Artman et al. |
| 2014/0129596 | A1 | 5/2014 | Howe |
| 2014/0222576 | A1 | 8/2014 | Shaw |
| 2014/0256362 | A1 | 9/2014 | Leclercq et al. |
| 2014/0324527 | A1 | 10/2014 | Kulkarni et al. |
| 2014/0324614 | A1 | 10/2014 | Kulkarni et al. |
| 2014/0324615 | A1 | 10/2014 | Kulkarni et al. |
| 2014/0379472 | A1 | 12/2014 | Rao et al. |
| 2014/0379480 | A1 | 12/2014 | Rao et al. |
| 2015/0025936 | A1 | 1/2015 | Garel et al. |
| 2015/0051953 | A1 | 2/2015 | Howe |
| 2015/0058088 | A1 | 2/2015 | Unser et al. |
| 2015/0080024 | A1 | 3/2015 | Khorashadi et al. |

FOREIGN PATENT DOCUMENTS

| | | |
|---|---|---|
| JP | 2011071599 A | 4/2011 |
| WO | 2015039254 A1 | 3/2015 |

* cited by examiner

SYSTEMS AND METHODS FOR DETERMINING DEVICE LOCATION USING WIRELESS DATA AND OTHER GEOGRAPHICAL LOCATION DATA

CROSS REFERENCE TO RELATED APPLICATIONS

This application is a continuation application of U.S. patent application Ser. No. 14/789,752, filed Jul. 1, 2015, entitled "SYSTEMS AND METHODS FOR DETERMINING DEVICE LOCATION USING WIRELESS DATA AND OTHER GEOGRAPHICAL LOCATION DATA", the disclosure of which is hereby incorporated herein by reference in its entirety.

BACKGROUND OF THE DISCLOSURE

This disclosure relates generally to determining a wireless device location and, more specifically, to systems and methods for determining a location of a user and their mobile computing device based on wireless signal strength data within, for example, indoor venues, and other geographical location data.

Geolocation data corresponding to various aspects of a person's activities is readily available. For example, many users have a Global Positioning System (GPS) associated with their activities in one way or another. Such GPS devices are installed in many automobiles today, either as stand-alone transportable units, or as integrated units positioned in the dashboard of the automobile as purchased. Additionally, many watches and smart phones are now available with embedded GPS receivers and the availability to access a mapping application for providing real-time global positioning and tracking capability.

While it is straightforward to determine the path of a user through the use of GPS, a temporal history of one's whereabouts can also be gleaned from many other sources. Even without a GPS receiver, the location of a cell phone on one's person can be roughly estimated from the regularly timed pings received from the device at a nearest receiver tower. More detailed location data is available when a user activates the cell phone to place a call. Similarly, information about the geolocation history and habits of users may be recorded from various internet and smart phone applications, such as Facebook®, Twitter®, Foursquare®, and other social media applications, including those through which users voluntarily and routinely "checkin" or otherwise publish information of their physical locations at any particular time.

In some venues, however, geolocation data may not be readily available, or may not be accurate enough to sufficiently determine the user's location. For example, GPS traditionally performs poorly in many indoor venues based on interference caused by building structures. In some venues, GPS may only be able to determine a location estimation within an area of approximately 15-25 meters. In other venues, GPS may not be accessible at all. As such, GPS may not be able to provide local position determination within a particular venue.

BRIEF DESCRIPTION OF THE DISCLOSURE

In one aspect, a computer-implemented method for determining device location of a user device within a venue is provided. The method is implemented using a wireless positioning system including a processor and a memory. The method includes identifying a plurality of signal sample sets. Each signal sample set includes a sample location within the venue and one or more wireless signal strengths of associated wireless access points positioned at the venue, and the sample location is determined based at least in part on location data associated with a corresponding payment card transaction within the venue. The method also includes receiving one or more subject wireless signal strength samples of the wireless access points captured by the user device at an unidentified location within the venue. The method further includes determining, by the processor, a subject location of the user device within the venue based at least in part on the plurality of signal sample sets and the one or more subject wireless signal strength samples. The method also includes providing the subject location of the user device within the venue.

In another aspect, a wireless positioning system for determining device location of a user device within a venue is provided. The wireless positioning system includes a processor communicatively coupled to a memory. The wireless positioning system is programmed to identify a plurality of signal sample sets. Each signal sample set includes a sample location within the venue and one or more wireless signal strengths of associated wireless access points positioned at the venue, and the sample location is determined based at least in part on location data associated with a corresponding payment card transaction within the venue. The wireless positioning system is also programmed to receive one or more subject wireless signal strength samples of the wireless access points captured by the user device at an unidentified location within the venue. The wireless positioning system is further programmed to determine a subject location of the user device within the venue based at least in part on the plurality of signal sample sets and the one or more subject wireless signal strength samples. The wireless positioning system is also programmed to provide the subject location of the user device within the venue.

In yet another aspect, at least one non-transitory computer-readable storage media having computer-executable instructions embodied thereon is provided. Wherein when executed by at least one processor, the computer-executable instructions cause the processor to identify a plurality of signal sample sets. Each signal sample set includes a sample location within a venue and one or more wireless signal strengths of associated wireless access points positioned at the venue, and the sample location is determined based at least in part on location data associated with a corresponding payment card transaction within the venue. The computer-executable instructions further cause the processor to receive one or more subject wireless signal strength samples of the wireless access points captured by a user device at an unidentified location within the venue. The computer-executable instructions further cause the processor to determine a subject location of the user device within the venue based at least in part on the plurality of signal sample sets and the one or more subject wireless signal strength samples. The computer-executable instructions also cause the processor to provide the subject location of the user device within the venue.

BRIEF DESCRIPTION OF THE DRAWINGS

FIG. 1 is a simplified block diagram of an example device location mapping system that includes a Wireless Positioning System (WPS) for providing device location within a public venue (e.g., an indoor setting such as a shopping mall or an airport).

FIG. 2 is a schematic diagram illustrating a device location mapping system that includes a multi-party transaction card industry system for authorizing payment card transactions, and a wireless positioning system (WPS) as shown in FIG. 1.

FIG. 3 illustrates an example configuration of a user system operated by a user, such as the cardholder shown in FIGS. 1 and 2 and/or the "subject user" shown in FIG. 1.

FIG. 4 illustrates an example configuration of a server system such as those shown in FIG. 1.

FIG. 5 is an example venue in which the Wireless Positioning System (WPS) may provide position determination of a subject user within the venue.

FIG. 6 is an example map of the venue shown in FIG. 5 which may be used by the WPS to provide position determination of a subject user within the venue.

FIG. 7 is an example method for providing position determination for a user such as the subject user shown in FIG. 5 location data and wireless data.

FIG. 8 shows an example configuration of a database within a computing device, along with other related computing components, that may be used to provide position determination of a user within a venue based at least in part on wireless signal data and location data.

DETAILED DESCRIPTION OF THE DISCLOSURE

Figure 1:
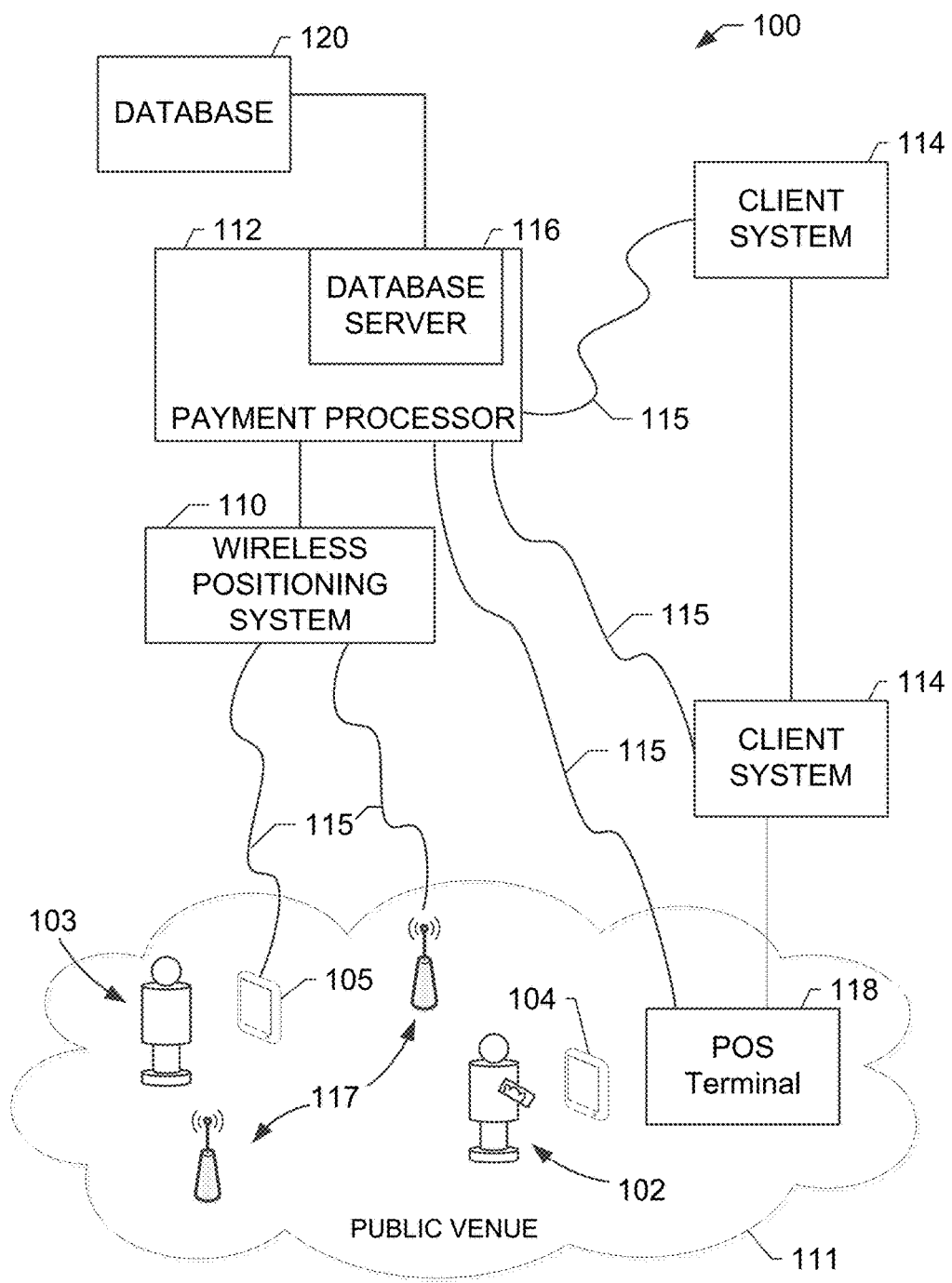
FIGS. 1-8 show example embodiments of the methods and systems described herein.

Systems and methods are described herein for providing location determination of users within, for example, indoor venues such as airports or shopping malls. In the example embodiment, the location users of wireless devices (e.g., smartphones, tablets, wearables, and other mobile computing devices) within an indoor venue or building is determined based on wireless data and based on other geolocation data (alternately referred to herein as "geographic location data") such as electronic device location data, including location data associated with a point-of-sale (POS) device in the indoor venue. In some cases, users of wireless devices are also cardholders of payment cards. In the example embodiment, the users of such wireless devices are also cardholders of payment cards ("sample cardholders"). For example, a primary account number (PAN) of the cardholder may be paired with the cardholder's smartphone (e.g., via a unique device ID). This pairing of a wireless device ID to a PAN may be achieved by, for example, a cardholder registering their wireless device ID to the PAN assigned to the cardholder, or by a mapping system that is configured to map cellular "ping data" with transaction data for multiple transactions of a device user.

A Wireless Positioning System (WPS) described herein collects "wireless sample data" associated with a sample cardholder's time spent in the indoor venue. For example, while the sample cardholder shops at a venue such as a shopping mall, the WPS may collect wireless sample data from the sample cardholder's wireless device, from a plurality of wireless access points (e.g., wireless routers) located in the indoor venue, and/or from a third party associated with the wireless access points (e.g., a wireless internet provider). This wireless sample data includes several wireless signal samples ("signal sample sets") collected at various points in time (e.g., at a "sample time"). Each sample includes signal strengths at the wireless device of one or more nearby wireless access points.

After the cardholder conducts a payment card transaction at a particular merchant's store within the venue (e.g., at the merchant's POS device), the WPS identifies the time of this payment card transaction and correlates particular wireless sample data taken at or near the time of the transaction. This sample, which includes at least the wireless sample data and the location of the cardholder (and, therefore, the cardholder's device) at the time of the transaction, and others like it ("historical wireless samples" or "historical samples," e.g., collected from this and other similar cardholders) are used by the WPS to approximate the location of other "subject users" within the venue. In other words, these historical samples become benchmark samples that may be used by the WPS for comparison of future wireless signal sets ("subject wireless samples" or "subject samples") to historical samples, for the purpose of locating the subject users of those subject wireless devices.

For example, the WPS collects a subject sample from a subject user's device (e.g., while the subject user is in the indoor venue), or from other sources as described more fully herein, and compares the subject sample to the historical samples to determine that the subject user is currently in or near a particular merchant's shop. As such, the historical samples collected from cardholders when performing transactions at known locations (e.g., the locations of the merchant POS devices are typically known locations) may be used to infer the location of a subject user based on the current signal strengths of the wireless access points as compared to the known historical samples.

More specifically, sample cardholders may pre-configure or otherwise associate their mobile device with their payment card, such as through registering a unique device ID or cellphone number with their issuing bank, such that the device ID is associated with the cardholder's PAN (for example, in a lookup table). Sample cardholders often use payment cards to pay for goods and services at merchant locations within a particular venue, and often have their mobile device with them at the time of the transaction. In some cases, the WPS may be configured to associate a device ID with a cardholder's PAN. The WPS may access or receive transaction data associated with a cardholder for prior transactions made by the cardholder. This "prior transaction data" includes, among other data, timestamps and locations of the prior transactions. The WPS may further access or receive cellular "ping data," which is data from cellular networks that defines a location of a cellular device based on which cellular tower the cellular device last used to connect to the cellular network (i.e., the cell tower last "pinged"). Accordingly, the WPS compares the locations of the prior transactions of the cardholder (from the transaction data) with locations of wireless devices (from the cellular ping data). The WPS is able to associate a cardholder (and the cardholder's associated PAN) with the wireless device by determining which wireless device was present at the same locations as a plurality of cardholder-initiated transactions.

During a payment card transaction initiated by a sample cardholder, transaction data is received and processed over a payment processing network. The transaction data includes data identifying the sample cardholder (e.g., via a payment card number of the payment card used to conduct the transaction, or a PAN) and the merchant (e.g., via a merchant identifier provided by the POS terminal). Through identification of the sample cardholder, the mobile device of the cardholder is also identified, namely in the case where the sample cardholder has registered the mobile device with the card number and/or in the case where the WPS has automatically linked the mobile device to the PAN based on prior transaction data and cellular ping data. The WPS is also configured to identify a "floor plan" of a venue, as well as a location of the POS terminal within that floor plan (e.g., through identification of the location of the merchant, based on their POS terminal information). As such, when the sample cardholder performs the payment card transaction, the sample cardholder's location is known to be at approximately the known location of the POS device associated with the transaction.

Further, at the time of the payment card transaction, the WPS also receives or identifies wireless sample data captured by the mobile device carried by the sample cardholder and/or by the wireless access points nearby the sample cardholder. Wireless access points, also referred to herein as "beacons," are devices that enable a user device to wirelessly connect to the Internet or another computer network. This "signal strength sample data" includes network identifiers for the one or more wireless access points identified (or "visible") to the mobile device at the time of the payment card transaction (e.g., while the consumer is at the POS terminal within the merchant's place of business), as well as an associated signal strength at the mobile device for each network identifier (e.g., number of "bars" of signal strength). The WPS correlates, or "signal-maps", the sample data of the mobile device with the payment card transaction data (e.g., the location of the particular POS device used) and stores the signal strength sample data, along with other device data and/or cardholder data, as "historical samples".

The WPS is configured to use these historical samples for position determination of a "subject user" within the venue based on signal strengths of wireless devices the same or different wireless access points as received at the subject user's mobile device. Once a number of historical samples have been collected and "signal-mapped" within the venue, the WPS may infer the location of other mobile devices within the venue based at least in part on the historical sample data, as well as a "subject sample" of wireless signals captured by the mobile device of the subject user. More specifically, the WPS receives a subject signal strength sample from the subject user's mobile device (and/or from the wireless access points associated with the wireless signals) and compares these current "subject" samples to the historical sample data. If, for example, the subject signal strength sample matches signal strengths of a particular historical sample, the WPS may provide the location associated with that historical sample as the position of the subject shopper within the venue. For example, the WPS may provide the current location ("subject location") of the subject user to a computer application such as a "maps" application ("app") used by the subject shopper to navigate about the venue, and the maps app may superimpose the current location on a map of the venue, or use the current location as a starting point when projecting a travel path to a destination point within the venue.

At least one of the technical problems addressed by this system includes: (i) poor performance of satellite-based global positioning systems (GPS) in certain venues, such as some indoor venues; (ii) difficulties associated with mapping of indoor venues, such as pre-determining physical locations of wireless access points (e.g., wireless beacons) present within the venues; and (iii) inability to provide accurate position determination of users within those venues.

A technical effect of the systems and processes described herein include at least one of: (i) identifying a plurality of signal sample sets, wherein each signal sample set includes a sample location within the venue and one or more wireless signal strengths of associated wireless access points positioned at the venue, wherein the sample location is determined based at least in part on location data associated with a corresponding payment card transaction within the venue; (ii) receiving one or more subject wireless signal strength samples of the wireless access points captured by a user device at an unidentified location within the venue; (iii) determining, by the processor, a subject location of the user device within the venue based at least in part on the plurality of signal sample sets and the one or more subject wireless signal strength samples; and (iv) providing the subject location of the user device within the venue.

The technical effect achieved by this system is at least one of: (i) aggregating historical signal strength samples collected at known locations and from wireless access points; (ii) correlating sample collection in conjunction with the timing of payment card transactions at a point-of-sale device having a known location; (ii) determining user position based on historical signal strength samples and a current signal strength sample; (iii) mapping the user position within a venue map. The wireless positioning system described herein leverages wireless access points, such as IEEE 802.11 wireless routers, and collects historical sample data in conjunction with payment card transactions, thereby providing a set of samples to compare against a current or subject sample to determine the location of a user. This WPS overcomes problems associated with GPS, as the WPS leverages local signals that are available in indoor locations.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example device location mapping system 100 including a Wireless Positioning System (WPS) 110 for providing device location within a public venue 111 (e.g., an indoor setting such as a shopping mall or an airport). Mapping system 100 includes a plurality of computer devices connected in communication in accordance with the present disclosure. In the example embodiment, mapping system 100 may be used to determine a location of a mobile computing device 104 within a public venue 111 that includes one or more wireless access points 117 and one or more POS terminals 118.

More specifically, in the example embodiment, mapping system 100 includes WPS 110, a payment processor 112 in communication with POS terminal 118 at a merchant location, and/or other client systems 114 associated with merchants, merchant banks, payment networks, issuer banks, and/or cardholders. Mapping system 100 further includes a plurality of wireless access points 117, within public venue 111. For example, venue 111 may include one or more wireless access points or broadcast devices 117 such as an IEEE 802.11 wireless LAN (WLAN) access point (e.g., wireless router). As explained below in detail, WPS 110 includes at least one processor in communication with a memory device, and is configured to determine a location of a user 102 (such as a cardholder have a payment card associated with payment processor 112) within venue 111. WPS 110 makes such a location determination based on wireless sample data collected from a user device associated with user 102, such as mobile computing device 104, and based on known location data collected from POS terminal 118 when user 102 initiates a payment transaction at POS terminal 118 using a payment card that is processed by a payment network including payment processor 112. As used herein, a "user" may be either a "cardholder" (having a payment card associated with payment processor 112) or a non-cardholder. The transaction process is described below with respect to FIG. 2. In the example embodiment, the wireless device location may be determined based on past payment card transaction data, received at WPS 110 from payment processor 112, and wireless sample data, received at WPS 110 from at least one of mobile computing devices 104, 105, wireless access points 117, and a wireless access point hub (e.g., wireless access point hub 640, shown in FIG. 5) associated with wireless access points 117.

In the example embodiment, payment processor 112 is also in communication with a plurality of client sub-systems, also referred to as client systems 114. In one embodiment, client systems 114 are computers including a web browser, such that payment processor 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

In the example embodiment, mapping system 100 also includes POS terminals 118, which may be connected to client systems 114, to payment processor 112, and/or to WPS 110. POS terminals 118 may be interconnected to the Internet (or any other network that allows the POS terminals 118 to communicate as described herein) through many interfaces including a network, such as a local area network (LAN) or a wide area network (WAN), dial-in-connections, cable modems, wireless LAN (e.g., IEEE 802.11 wireless networks), and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device on which a cardholder interacts with a merchant to complete a payment card transaction.

A database server 116 is connected to database 120, which contains information on a variety of matters, as described below in greater detail. In one embodiment, centralized database 120 is stored on payment processor 112 and can be accessed by potential users at one of client systems 114 and/or WPS 110. In an alternative embodiment, database 120 is stored remotely from payment processor 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, wireless access point identifiers and signal strength information, and/or purchases made. Database 120 may also store account data including at least one of a cardholder name, a cardholder address, an account number, and other account identifiers. Database 120 may also store merchant data including a merchant identifier that identifies each merchant registered to use the network, and instructions for settling transactions including merchant bank account information. Database 120 may also store purchase data associated with items being purchased by a cardholder (e.g., cardholder 102) from a merchant, and authorization request data. Database 120 may also store loyalty rewards information.

In the example embodiment, WPS 110 receives transaction data for a cardholder 102 that has conducted a transaction at POS device 118 in public venue 111. WPS 110 also receives wireless sample data for a mobile computing device 104 associated with cardholder 102. For example, mobile computing device 104 is associated with cardholder 102 by matching a PAN of cardholder's 102 account with a device ID for mobile computing device 104.

The wireless sample data received by WPS 110 is captured by mobile computing device 104 at or near the time that cardholder 102 is conducting the payment card transaction at POS terminal 118. Wireless sample data includes signal strength sample data including a wireless network identifier of wireless access points 117 and associated signal strengths of wireless access points 117 at mobile computing device 104 based on a "device position" of mobile computing device 104 of cardholder 102 within public venue 111 (e.g., based on where mobile computing device 104 is located at that "sample time" within public venue 111). The wireless sample data may be received directly from mobile computing device 104. Mobile computing device 104 measures the signal strength of the broadcasts from the various wireless access points 117 (e.g., in a number of "bars" of signal strength). Mobile computing device 104 may record and transmit the record of these various signal strength ("signal strength sample data") at various times, such as during initiation of a transaction associated with an account matched with the device ID of mobile computing device 104, or when queried by WPS 110 to provide such signal strength sample data.

Additionally or alternatively, WPS 110 may receive wireless sample data, including signal strength sample data, from one or more access points 117 or a hub associated with access points 117 (e.g., an internet service provider). When not connected to a wireless network, with a mobile computing device's wireless transceiver turned on, the mobile computing device 104 sends out interrogation signals attempting to locate and determine available networks. These wireless interrogations often include a unique identifier, referred to herein as a "device ID." A strength of these interrogation signals varies with a distance away from the mobile computing device 104 and may be used to determine a relative distance between the mobile computing device 104 and the wireless access point 117. The device ID is used to keep track of the relative signal strength of each of a plurality of mobile computing devices 104 at the same time. The wireless sample data can also include time information such that the signal strength sample data can be stored for each of a plurality of devices 104 at different times during a selected period of time.

The wireless sample data represents a "location profile" of a particular location or position within public venue 111 (e.g., the location of POS device 118). WPS 110 stores such historical samples in database 120. During later operations, WPS 110 collects subject signal strength sample data (e.g., "signal sample sets") associated with a mobile computing device 105 of a subject user 103 within public venue 111. WPS 110 compares the subject signal strength sample data captured at mobile computing device 105 to the historical samples in database 120 and determines a location or position of mobile computing device 105 of subject user 103 within public venue 111. More specifically, in some embodiments, WPS 110 finds the location profile that most closely matches the subject signal strength sample and provides that location as the location of the subject user 103. In some embodiments, WPS 110 uses statistical analysis of the historical samples and the subject sample, to determine the most probable location of subject user 103 within venue 111.

One potential source of geolocation data is payment card usage. Both users and issuers of payment cards are particularly concerned with preventing unauthorized use of payment cards as early as possible. If a payment card user (e.g., cardholder 102 and/or subject user 103) opts into a payment card security system (e.g., providing his or her cell phone number), a direct correlation can be made between every point-of-sale purchase of the cardholder and the contemporaneous location of the cardholder's cell phone. In co-owned, co-pending patent application Ser. No. 13/457,701, filed Apr. 27, 2012, entitled "Method for Providing Payment Card Security using Registrationless Telecom Geolocation Capture," by Howe et al., a method for enabling secure payment card usage without requiring a user to enroll or register is provided. A geo-temporal history of a payment card user's point-of-sale purchases is tracked to compare geolocation information for cell phones operated by a mobile network provider to contemporaneous cell phone location in order to match cell phone owners to their payment card accounts. A unique identification number can be assigned by the network provider in lieu of providing the matching cell phone numbers to the payment card issuer in order to maintain privacy. The identity of a payment card user can then be securely verified by the merchant in future purchases by querying the mobile network operator for the location of the payment card user's cell phone number (corresponding to the Identification Number) at the time of the purchase.

As an additional feature of the systems and methods described herein, in some embodiments, WPS 110 may further be configured to associate mobile computing device 104 with cardholder 102 by generating a "geotemporal fingerprint" for mobile computing device 104. A geotemporal fingerprint can be generated based on a compilation of geolocation information and timestamps that track a mobile computing device's location and activities of a user (e.g., cardholder 102) associated with the mobile computing device, as described in co-owned application Ser. No. 13/671,791, entitled "Methods For Geotemporal Fingerprinting," by Howe (which is incorporated herein by reference in its entirety). A geotemporal fingerprint can be generated for mobile computing devices from "ping" data. A cell phone (or other cellular-enabled mobile computing device) "pings" a nearest cell tower at regular intervals, for example, about every five minutes. A telecommunications service provider may store this information for a period of time, in some cases, up to about forty-eight (48) hours. The ping data includes a device ID associated with the mobile computing device from which the ping originates, and a geolocation, for example, a cell phone tower ID, which also corresponds to a broadcast area. The device ID is preferably associated with each mobile computing device and associated with the geotemporal fingerprint for distinguishing the mobile computing device from others in a mobile device database (e.g., a cell phone database). Once a primary (e.g., home) and a secondary (e.g., work place or school) region associated with each device ID are identified, other identifying criteria can be defined and ascertained from the ping data and recorded to generate a geotemporal fingerprint for each mobile computing device.

Alternatively, a geotemporal fingerprint for a cardholder or a social media user can be generated from other databases related to other types of consumer activity, such as one of various types of on-line social networking databases or payment card usage. In these embodiments, a geotemporal fingerprint is similarly formed from the geotemporal data, which can include beacon or cell tower IDs or addresses, IP addresses (for example, from a merchant location when a payment card is used, or from a computer/smart phone utilized by a consumer accessing social networking databases), or GPS coordinates, for example. This data will also contain a device/account/profile ID, a geolocation, and a date and time of day, and may also include a period of time associated with the use of the mobile computing device at the geolocation (for example, a time span over which the associated user is logged on to an activity and active).

Geotemporal fingerprints for mobile computing devices can be compared to geotemporal fingerprints generated from payment card usage to match a cardholder account with a mobile computing device using, for example, transaction data associated with the cardholder's payment card. Records of on-line purchases initiated using the payment card can also be collected with geotemporal (including IP address) data. Accordingly, WPS 110 may associate or match mobile computing device 104 to cardholder 102 (or cardholders 102's account and associated PAN) with cardholder 102 needing to pre-register mobile computing device 104.

Figure 2:
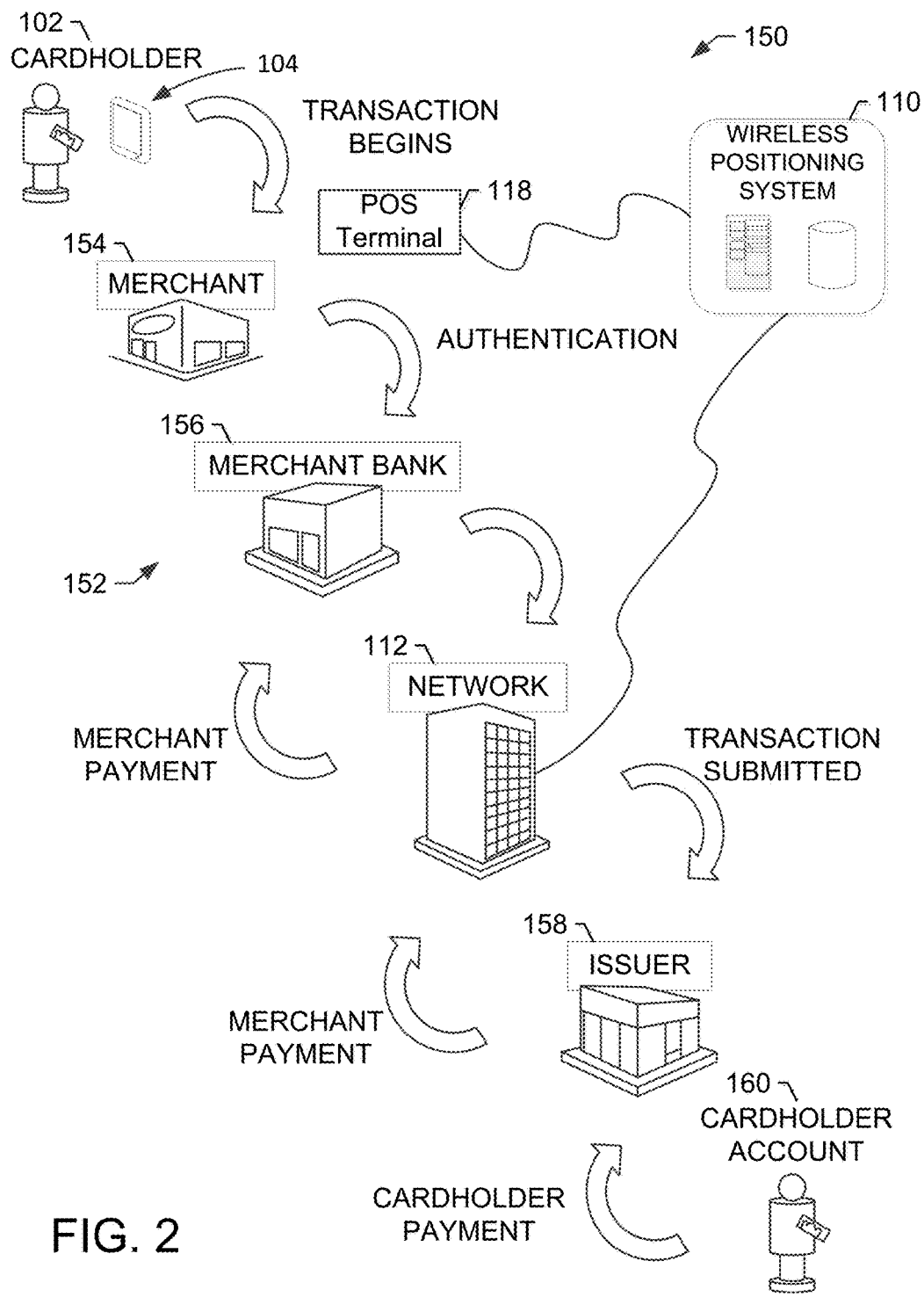

FIG. 2 is a schematic diagram illustrating a device location mapping system 150 that includes a multi-party transaction card industry system 152 for authorizing payment card transactions, and wireless positioning system (WPS) 110. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a transaction card system 152, a financial institution called the "issuer" issues a transaction card, such as a credit card, to a consumer or cardholder 102, who uses the transaction card to tender payment for a purchase from a merchant 154. To accept payment with the transaction card, merchant 154 must normally establish an account with a financial institution that is part of the financial payment system. This financial institution is usually called the "merchant bank," the "acquiring bank," or the "acquirer." When cardholder 102 tenders payment for a purchase with a transaction card, merchant 154 requests authorization from a merchant bank 156 for the amount of the purchase. The request may be performed over the telephone, but is usually performed through the use of a point-of-sale terminal, which reads cardholder's 102 account information from a magnetic stripe, a chip, or embossed characters on the transaction card and communicates electronically with the transaction processing computers of merchant bank 156. Alternatively, merchant bank 156 may authorize a third party to perform transaction processing on its behalf. In this case, the point-of-sale terminal 118 will be configured to communicate with the third party. Such a third party is usually called a "merchant processor," an "acquiring processor," or a "third party processor."

Using an interchange network 112 (which is similar to or includes payment processor 112, shown in FIG. 1), computers of merchant bank 156 or payment processor 112 will communicate with computers of an issuer bank 158 to determine whether cardholder's 102 account 160 is in good standing and whether the purchase is covered by cardholder's 102 available credit line. Based on these determinations, the request for authorization will be declined or accepted. If the request is accepted, an authorization code is issued to merchant 154.

When a request for authorization is accepted, the available credit line of cardholder's 102 account 160 is decreased. Normally, a charge for a payment card transaction is not posted immediately to cardholder's 102 account 160 because bankcard associations, such as MasterCard International Incorporated®, have promulgated rules that do not allow merchant 154 to charge, or "capture," a transaction until goods are shipped or services are delivered. However, with respect to at least some debit card transactions, a charge may be posted at the time of the transaction. When merchant 154 ships or delivers the goods or services, merchant 154 captures the transaction by, for example, appropriate data entry procedures on the point-of-sale terminal 118. This may include bundling of approved transactions daily for standard retail purchases. If cardholder 102 cancels a transaction before it is captured, a "void" is generated. If cardholder 102 returns goods after the transaction has been captured, a "credit" is generated. Interchange network 112 and/or issuer bank 158 stores the transaction card information, such as a type of merchant, amount of purchase, date of purchase, in a database 120 (shown in FIG. 1). Further, in some embodiments, interchange network 112 and/or issuer bank 158 stores in database 120 information associated with a loyalty program such as, for example, an amount of loyalty points associated with the cardholder and/or the transaction.

After a purchase has been made, a clearing process occurs to transfer additional transaction data related to the purchase among the parties to the transaction, such as merchant bank 156, interchange network 112, and issuer bank 158. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 154, merchant bank 156, and issuer bank 158. Settlement refers to the transfer of financial data or funds among merchant's 154 account, merchant bank 156, and issuer bank 158 related to the transaction. Usually, transactions are captured and accumulated into a "batch," which is settled as a group. More specifically, a transaction is typically settled between issuer bank 158 and interchange network 112, and then between interchange network 112 and merchant bank 156, and then between merchant bank 156 and merchant 154.

In the example embodiment, cardholder 102 shops at a public venue 111 (as shown in FIG. 1) including one or more merchants 154 and one or more wireless access points 117 (also shown in FIG. 1), such as a shopping mall. Cardholder 102 carries a mobile computing device 104 capable of communicating with these wireless access points 117, such as a smartphone or tablet computer. At various times while shopping (e.g., when cardholder 102 is at a known location such as a POS terminal 118 at a location within merchant 154), WPS 110 collects wireless sample data (e.g., signal strength sample data) of the various access points currently within range of mobile computing device 104. WPS 110 is configured to receive transaction data from payment processor 112, transaction data including merchant 154 and/or POS terminal 118 identifiers, which enables WPS 110 to locate cardholder 102 within venue 111 (i.e., located cardholder 102 at POS terminal 118). The transaction data may also include a timestamp for the time the transaction was initiated, which enables WPS 110 to access wireless sample data for the mobile computing device 104 at the same time indicated in the timestamp. WPS 110 later uses this wireless sample data to determine a location of a mobile computing device 105 (as shown in FIG. 1) within the venue 111.

Figure 3:
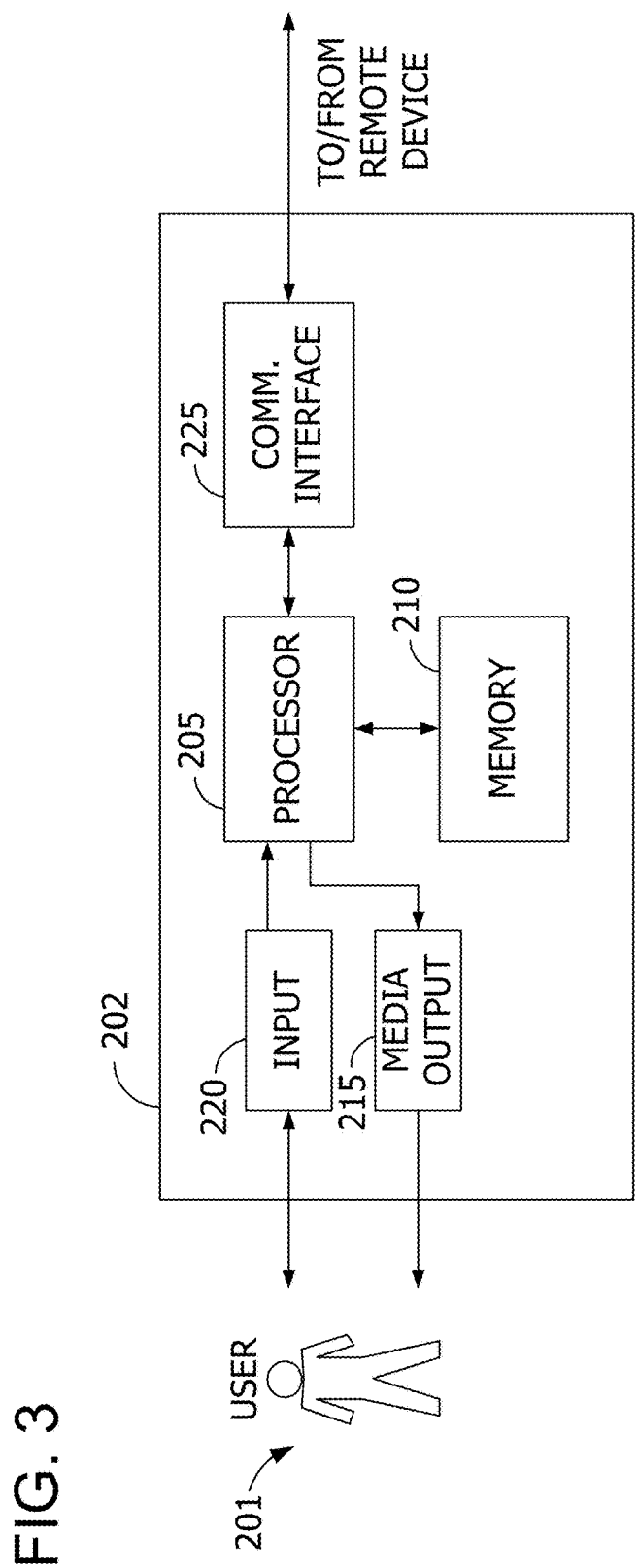

FIG. 3 illustrates an example configuration of a user system 202 operated by a user 201, such as cardholder 102 (shown in FIGS. 1 and 2) and/or subject user 103 (shown in FIG. 1). User system 202 may include, but is not limited to, client systems 114, POS terminal 118, and mobile computing devices 104, 105 (all shown in FIG. 1). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as payment processor 112 or WPS 110. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX), or an 802.11 wireless network (WLAN).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from a server system such as WPS 110 or payment processor 112. A client application allows user 201 to interact with a server application from a server system.

Figure 4:
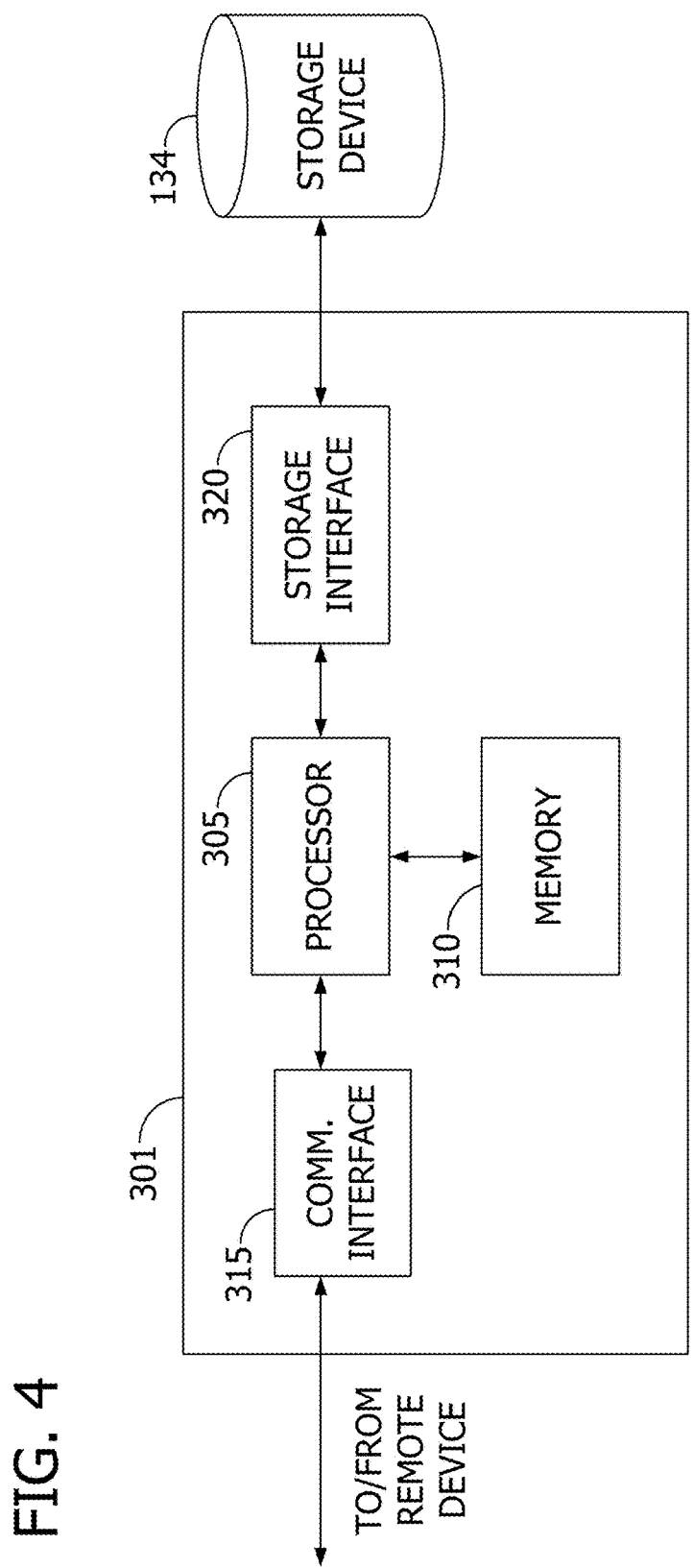

FIG. 4 illustrates an example configuration of a server system 301 such as payment processor 112 (shown in FIG. 1). Server system 301 may alternatively include, but is not limited to, database server 116 and/or WPS 110 (also shown in FIG. 1).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client system 114 via the Internet, as illustrated in FIG. 1.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
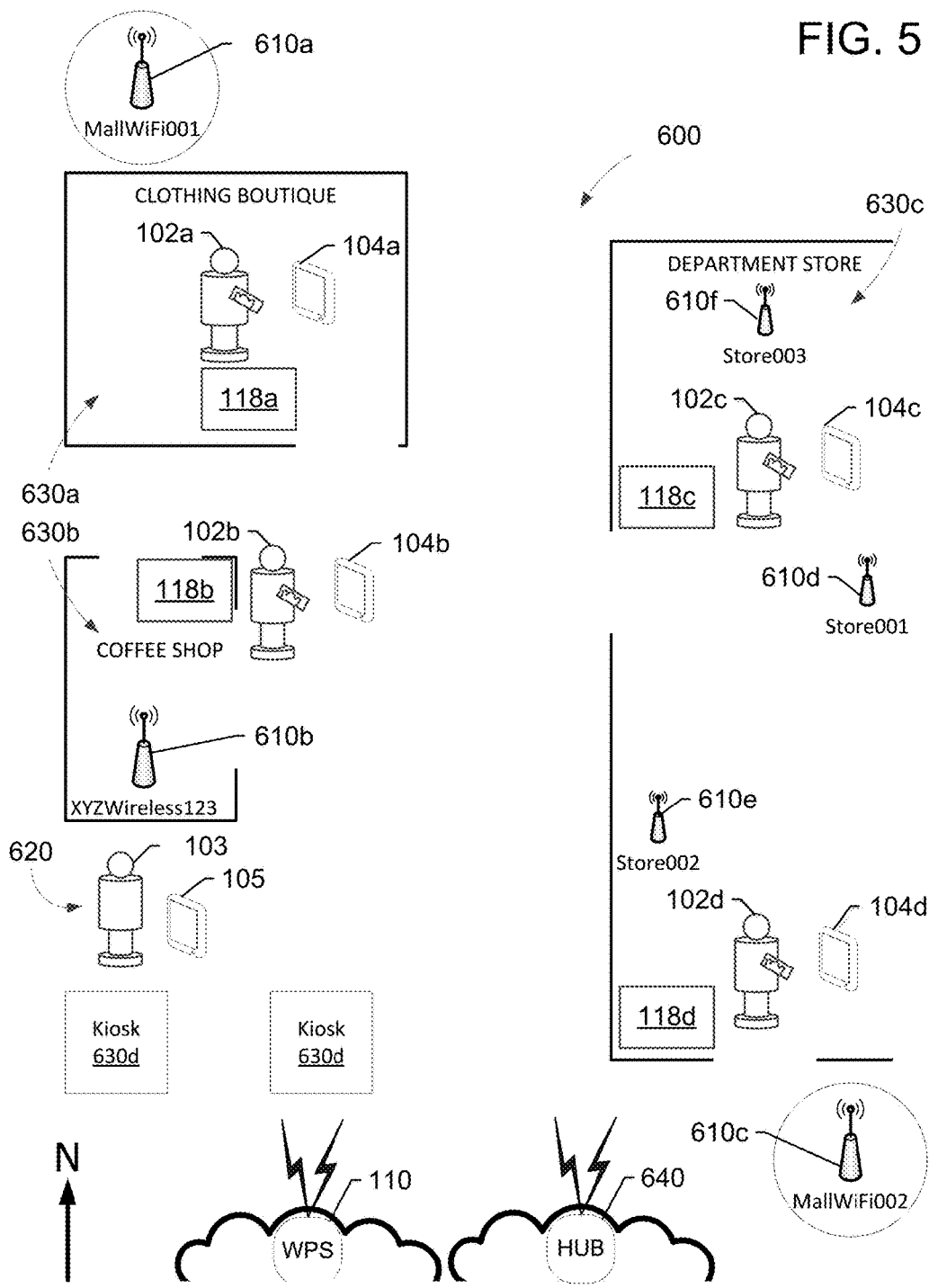

FIG. 5 is an example venue 600 in which Wireless Positioning System (WPS) 110 may provide position determination of a subject user 103. In the example embodiment, venue 600 is a shopping mall in which several merchants 630 offer goods and services to cardholders 102. Venue 600 may similar to public venue 111, shown in FIG. 1. A clothing boutique 630a has a point-of-sale (POS) device 118a, a coffee shop 630b has a POS device 118b, and a department store has two POS devices 118c, 118d.

Further, in the example embodiment, venue 600 also has several wireless access points 610. More specifically, the shopping mall provides two public wireless access points 610a, 610c, such as IEEE 802.11 WLAN routers, and coffee shop 630b provides a private wireless access point 610b secured for use by their customers. In addition, department store 630c provides wireless access points 610d, 610e, and 610f, any of which may be private or public. Each wireless access point 610 is identifiable by a device or network identifier unique at least as between the other nearby wireless access points 610 (referred to herein as "network identifier"). More specifically, in the example embodiment, each wireless access point 610 has a unique service set identifier (SSID) or "network name" configured for the access point. For example, the network identifier of wireless access point 610a is "MallWiFi001", the network identifier of wireless access point 610b is "XYZWireless123", and the network identifier of wireless access point 610c is "MallWiFi002". In the example embodiment, these network identifiers are discoverable or "visible" to other 802.11-compliant client devices, in some cases whether the wireless network is otherwise "secured" or not.

In the example embodiment, venue 600 illustrates several cardholders or "sample cardholders" 102. The term "sample cardholder", as used herein, refers to a cardholder from whom wireless sample data ("signal sample sets") are collected, as described herein. Each illustrated sample cardholder 102 carries with them a mobile computing device 104, such as a smartphone or a tablet. Each mobile computing device 104 is capable of scanning and discovering the presence and network identifier of one or more wireless access points 610, such as wireless access points 610a, 610b, 610c, 610d, 610e, and 610f, within some physical range. In addition, each wireless access point 610 is configured to discovering the presence and device ID of one or more mobile computing devices 104.

Further, as is common with many "wireless-enabled" devices, each computing device 104 also determines a "signal strength" of each wireless access point 610 within its range (e.g., via a "signal strength meter"). For example, some vendors of smartphones may provide a signal strength meter showing a tiered signal strength, ranging from a strength indicator such as "very weak", or based on a number of "bars", where "0 bars" indicates a very weak signal strength (e.g., barely visible, normally indicating a relatively extended distance between the computing device and the associated wireless access point), and up to a maximum strength indicator such as "very strong", or a number of bars such as "3 bars" or "5 bars", indicating a very strong signal (e.g., when there is a close proximity between the computing device and the associated wireless access point).

In the example embodiment, it is presumed that each particular sample cardholder 102 is associated with both one or more payment cards and at least one mobile computing device 104. In other words, when a payment card transaction is identified, an associated computing device 104 may also be identified, for example, based on the cardholder account number or PAN used in the transaction. In some embodiments, as described above, a sample cardholder 102 may pre-register a mobile computing device 104 to be associated with his/her PAN. In some embodiments, WPS 110 may be configured to associate a mobile computing device 104 with a cardholder PAN using prior transaction data and cellular ping data.

In the example venue 600, sample cardholder 102a is depicted in clothing boutique 630a, and near that merchant's POS device 118a (e.g., performing a payment card transaction for goods or services). In the example embodiment, sample cardholder 102a initiates a transaction at POS device 118a. WPS 110 receives transaction data associated with the transaction, the transaction data including at least location data and account data. WPS 110 uses the location data, such a merchant 630a identifier or POS device 118a identifier, to locate sample cardholder 102a within venue 600, in particular, at or nearby POS device 118a. WPS 110 also uses the account data, such a PAN associated with the account of sample cardholder 102a, to perform a lookup of the device ID associated with mobile computing device 104a of sample cardholder 102a, which enables WPS 110 to access a signal sample set (such as signal strength sample data) for mobile computing device 104a at the time of the transaction. At the time of sample cardholder's 102a payment card transaction, mobile computing device 104a of sample cardholder 102a performs a wireless signal scan to determine which wireless access points 610 are currently visible at this location (e.g., while sample cardholder 102a is at POS device 118a), as well as associated strengths of each visible wireless access point 610. Presume, for example, that the signal strength sample data for device 104a at POS device 118a at the time of the payment card transaction is:

TABLE 1

| Signal Strength Sample Data at POS 118a | | | | | | |
| --- | --- | --- | --- | --- | --- | --- |
| | MallWiFi 001 | XYZWireless 123 | MallWiFi 002 | Store 001 | Store 002 | Store 003 |
| Signal Strength @ 118a | 5 | 4 | — | 2 | 1 | 4 |

In Table 1, a signal strength listed as "--" indicates a wireless access point 610 that is not visible or not present in the collected sample. In other words, at the time that device 104a captured signal strength data for this example, access point "MallWiFi002" 610c was not visible by device 104a at POS 118a.

WPS 110 collects and stores wireless sample data, or signal sample sets, including the signal strength sample data shown in Table 1, along with perhaps other data such as a cardholder identifier and device data such as a device manufacturer, device type, make, model, operating system version, and/or firmware version of computing device 104a. WPS 110 may access wireless sample data directly from mobile computing device 104a. Additionally or alternatively, WPS 110 may access wireless sample data from multiple wireless access points 610 and/or from a hub 640, which is in communication with at least one (and, in some embodiments, all) of wireless access points 610. More specifically, hub 640 may be associated with a particular wireless internet service provider, and may maintain only some or all of wireless access points 610 in venue 600. Wireless access point 610a, (taking wireless access point 610a as a particular example, for clarity only) also collects signal strength data sample for the signal produced at wireless access point 610a relative to each mobile computing device 104 in range of wireless access point 610a. Hub 640 collects all of the signal strength sample data from wireless access points 610. Accordingly, WPS 110 may access wireless sample data from wireless access points 610 and/or hub 640. WPS 110 may request only wireless sample data associated with device IDs of mobile computing devices 104, or may access all available wireless sample data and perform its own lookup of device IDs to retrieve associated wireless sample data. WPS 110 may collect or otherwise access the wireless sample data at the time the transaction is made ("real-time") or at a later period of time (e.g., collecting wireless sample data in "batches").

The signal strengths listed in Table 1, and in subsequent examples, are in a "number of bars" ranging between 1 and 5 (e.g., 1 being visible but weak, 5 being the strongest), but other ranges, and other units of signal strength are possible. The signal strength sample data shown in Table 1 indicates that device 104*a*, at the time of sampling (e.g., when conducting the payment card transaction at POS terminal 118*a*), showed a maximum strength reading for wireless access point "MallWiFi001" (e.g., 5 bars), a good strength reading for wireless access point "XYZWireless123" (e.g., 4 bars), no reading for wireless access point "MallWiFi002", a poor strength reading for wireless access point "Store001" (e.g., 2 bars), a weak strength reading for wireless access point "Store002" (e.g., 1 bar), and a good strength reading for wireless access point "Store003."

Similarly, in the example embodiment, cardholders 102*b*, 102*c*, and 102*d* are each at other locations within venue 600 (coffee shop 630*b* and department store 630*c*), each performing a payment card transaction at an associated POS device 118*b*, 118*c*, and 118*d*, respectively, and each carrying with them an associated mobile computing device 104*b*, 104*c*, and 104*d*, respectively. Presume, for example, that the signal strength sample data for mobile computing devices 104*b*, 104*c*, and 104*d* at POS terminals 118*b*, 118*c*, and 118*d*, respectively, at the time of the payment card transaction is:

TABLE 2

| Signal Strength Data at POS 118b, 118c, and 118d | | | | | |
|---|---|---|---|---|---|
| MallWiFi 001 | XYZWireless 123 | MallWiFi 002 | Store 001 | Store 002 | Store 003 |
| Signal Strength @ 118b | | | | | |
| 3 | 5 | 2 | 1 | 3 | 1 |
| Signal Strength @ 118c | | | | | |
| 3 | 3 | 2 | 5 | 4 | 5 |
| Signal Strength @ 118d | | | | | |
| — | 3 | 5 | 4 | 5 | 2 |

In Table 2, as in Table 1, a signal strength listed as "--" indicates a wireless access point 610 that is not visible or not present in the collected sample.

In the example embodiment, WPS 110 builds a "location profile" for a location of each POS terminal 118 in venue 600. In the example embodiment shown and described here, only one wireless sample is collected at each POS device 118 for simplifying the discussion. In other words, each location profile for each POS device 118 is built from only a single wireless sample record (e.g., one of the wireless samples shown in Tables 1 and 2). In other embodiments, WPS 110 collects and builds position profiles of POS locations 118 using many wireless samples collected at each POS device 118, and from a plurality of mobile computing devices 104, and across many device types, vendors, makes, models, operating systems, and firmware versions. WPS 110 may aggregate one or more samples associated with a particular POS terminal 118 into one or more location profiles for that POS terminal 118. Accordingly, in the example embodiment, WPS 110 has a plurality of location profiles for a plurality of locations or positions (e.g., locations of POS devices 118) within venue 600.

In the example embodiment, WPS 100 determines a subject location 620 of another person, e.g., subject user 103, while they are in venue 600. In the example shown in FIG. 5, subject user 103 is in a mall hallway just north of kiosks 630*d* and just south of coffee shop 630*b*. Subject user 103 carries a mobile computing device 105, similar to mobile computing devices 104, 105 (shown in FIGS. 1 and 2) and to devices 104*a*-104*d*, which is also able to scan and discover wireless access point such as access points 610*a*-610*f*. In some embodiments, subject user 103 may, for example, have an indoor positioning app running on device 105 that includes an indoor map of venue 600, but the indoor positioning app may require a location determination of subject user 103 from WPS 110 in order to display to subject user 103 where they are on the map.

To determine subject location 620, device 105 performs a signal strength scan and transmits to WPS 110 "subject signal strength data" that includes the wireless network identifiers visible to device 105 and associated signal strengths at the time of the scan, as well as potentially other information such as described above with regard to wireless sample data. Additionally or alternatively, WPS 110 may access subject signal strength data from one or more wireless access points 610 and/or hub 640. Presume, for example, that that the subject signal strength data for device 105 when subject user 103 is at location 620 is:

TABLE 3

| Subject Signal Strength Data at Subject Location 620 | | | | | |
|---|---|---|---|---|---|
| MallWiFi 001 | XYZWireless 123 | MallWiFi 002 | Store 001 | Store 002 | Store 003 |
| Signal Strength @ 620 | | | | | |
| 1 | 5 | 2 | 1 | 3 | 1 |

WPS 110 receives the subject signal strength data for mobile computing device 105 from, for example, mobile computing device 105. WPS 110 is configured to perform various statistical analysis on the subject signal strength data in order to determine the location of the subject user 103. For example, WPS 110 may analyze the subject signal strength data to determine the signal strength sample data most similar to the subject signal strength data, and may return the location profile associated with the similar sample data as the likely location of the subject user 103. WPS 110 may provide the location of subject user 103 with an uncertainty or range, such as, for example, within 10 feet or 5 m of the provided (exact) location. As another example, WPS 110 may use a plurality of signal sample sets to generate a likely signal set for every location within the indoor venue 600. WPS 110 may use the plurality of signal sample sets to generate signal ranges for each wireless access point 117, for example, how far the signal from a particular access point 117 is broadcast, and where the signal range changes from, for example, 5 bars to 4 bars, from 4 bars to 3 bars, and so on. Accordingly, by generating signal ranges for each access point 117, WPS 110 can use the subject signal strength data and the signal ranges to triangulate the location of the subject user 103.

Figure 6:
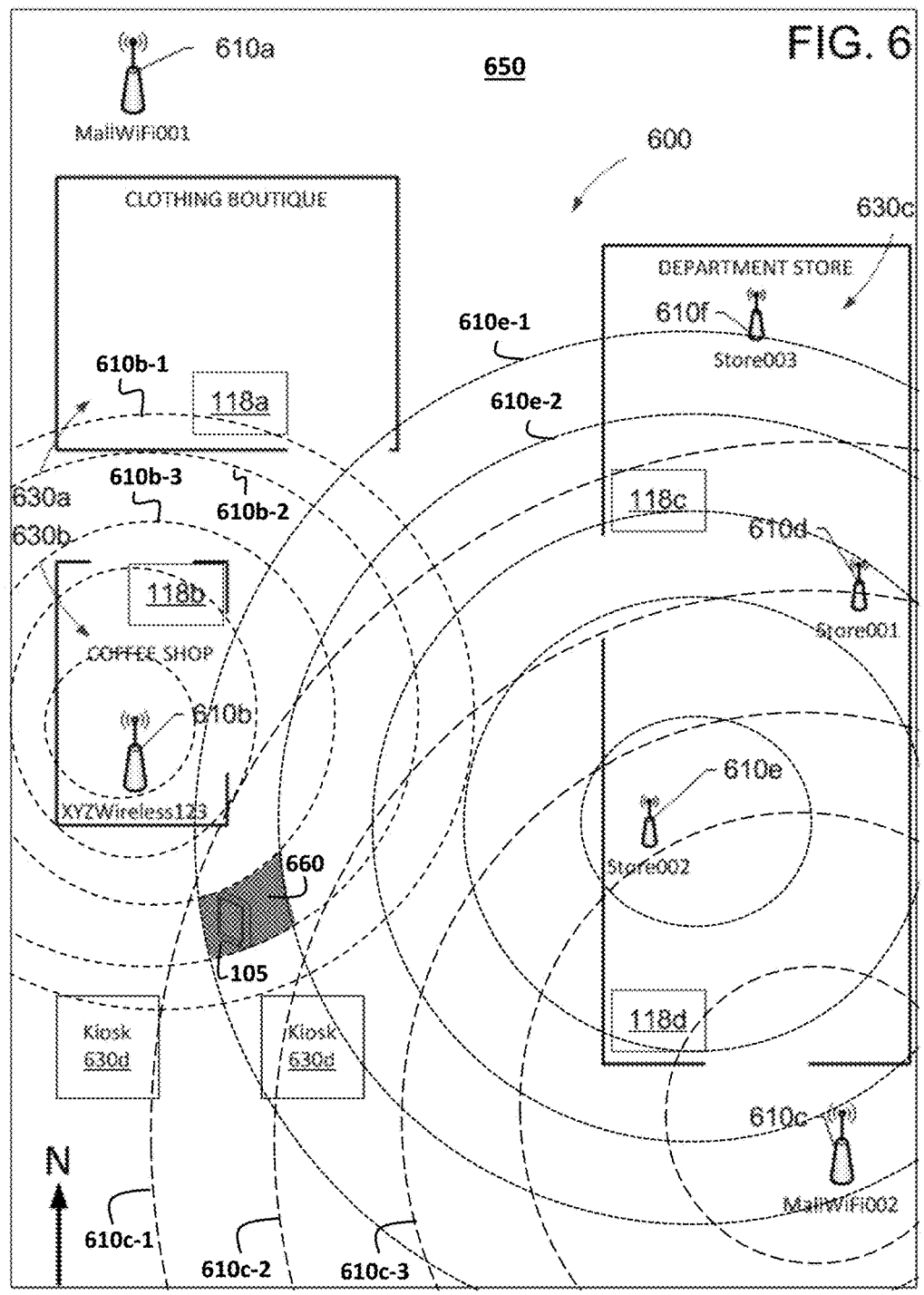

FIG. 6 is an example embodiment of a map 650 included in WPS 110. WPS 110 may use map 650 of venue 600 to identify POS locations 118 relative to map 650, for example, relative to other landmarks on map 650 (as opposed to identifying POS locations 118 in terms of geographic coordinates or other absolute locations). WPS 110 may use map 650 to identify locations of the various wireless access points 117 relative to the map 650. In some embodiments, as described above, WPS 110 may determine signal ranges of wireless access points 117 that WPS 110 uses to determine a location of a subject user 103 (shown in FIG. 5).

WPS 110 may identify signal ranges of the wireless access points 117 as, for example, single or multiple concentric circles or ellipses (or any other shape) around each wireless access point. In the example embodiment, map 650 includes signal ranges for "XYZWireless123" access point 610b, "Store002" access point 610e, and "MallWiFi002" access point 610c. (Signal ranges for only three access points 610 are shown on map 650, for clarity. In other embodiments, WPS 110 may identify signal ranges for any number of access points 610.) Concentric or overlapping ellipses may indicate associated boundaries of different signals strengths (e.g., where a 5-bar signal becomes a 4-bar signal). The outer boundary for a 1-bar signal from "XYZ-Wireless123" access point 610b is indicated on map 650 by 610b-1 (and other outer boundaries are similarly indicated). WPS 110 uses the generated signal ranges to identify or determine the location of subject user 103 on map 650 (i.e., in venue 600).

In the example embodiment, WPS 110 has received a subject signal strength sample set that denotes, among other things, that mobile computing device 105 of subject user 103 has a signal strength of 2 bars associated with "XYWWireless123" access point 610b, a signal strength of 1 bar associated with "Store002" access point 610e, and a signal strength of 1 bar associated with "MallWiFi002" access point 610c. Accordingly, WPS 110 may triangulate the location of mobile computing device 105 (and, thus, subject user 103) to an area 660, which is defined by the respective boundaries 610b-2, 610e-1, and 610c-1. WPS 110 may use map 650 to provide the location of subject user 103 in a manner useful to subject user 103. For example, WPS 110 may identify the location of subject user 103 on the map 650 as a dot or an icon at the center of area 660 (without displaying area 660). As area 660 may encompass about 15 square feet, WPS 110 may identify the location of mobile computing device 105 in the center of area 660 and identify a location uncertainty of about 3 feet (which may be displayed to subject user 103 as a circle with a scaled 3-foot radius around the location).

Figure 7:
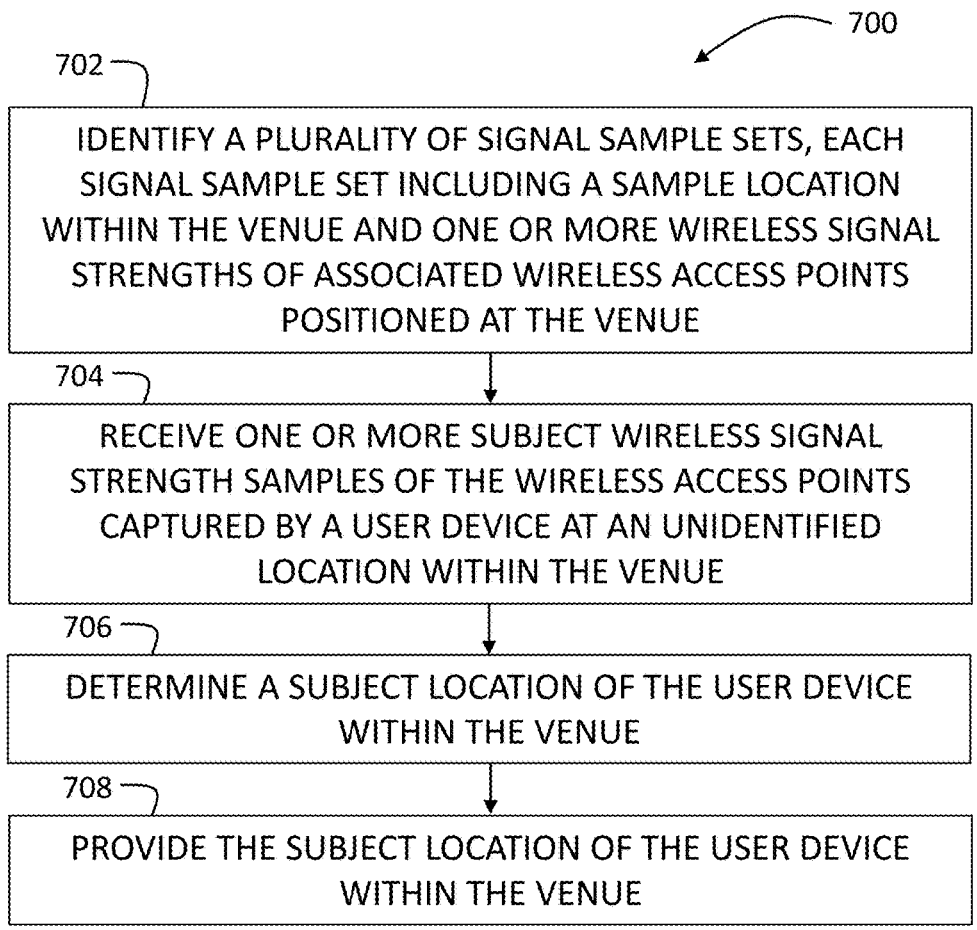

FIG. 7 is an example method 700 for providing position determination for a user such as subject user 103 (shown in FIGS. 1 and 5) within a venue using payment card transaction data and wireless data. In the example embodiment, method 700 is performed by one or more computing systems such as payment processor 112 (shown in FIG. 1), wireless positioning system 110 (shown in FIGS. 1 and 2), mobile computing device 104 (shown in FIG. 1), mobile computing devices 104a-104d, 105 (shown in FIG. 5), or by computing device 810 (shown in FIG. 8). In some embodiments, method 700 includes identifying 702 a plurality of signal sample sets. Each signal sample set may include a sample location within the venue (e.g., venue 111 or venue 600) and one or more wireless signal strengths of associated wireless access points (e.g., wireless access points 117 or wireless access points 610) positioned at the venue. The sample location may be determined based at least in part on location data associated with a corresponding payment card transaction within the venue. Method 700 also includes receiving 704 one or more subject wireless signal strength samples of the wireless access points captured by the user device (e.g., mobile computing device 104, 105) at an unidentified location within the venue. Method 700 further includes determining 706 a subject location of the user device within the venue based at least in part on the plurality of signal sample sets and the one or more subject wireless signal strength samples. Method 700 also includes providing 708 the subject location of the user device within the venue.

Figure 8:
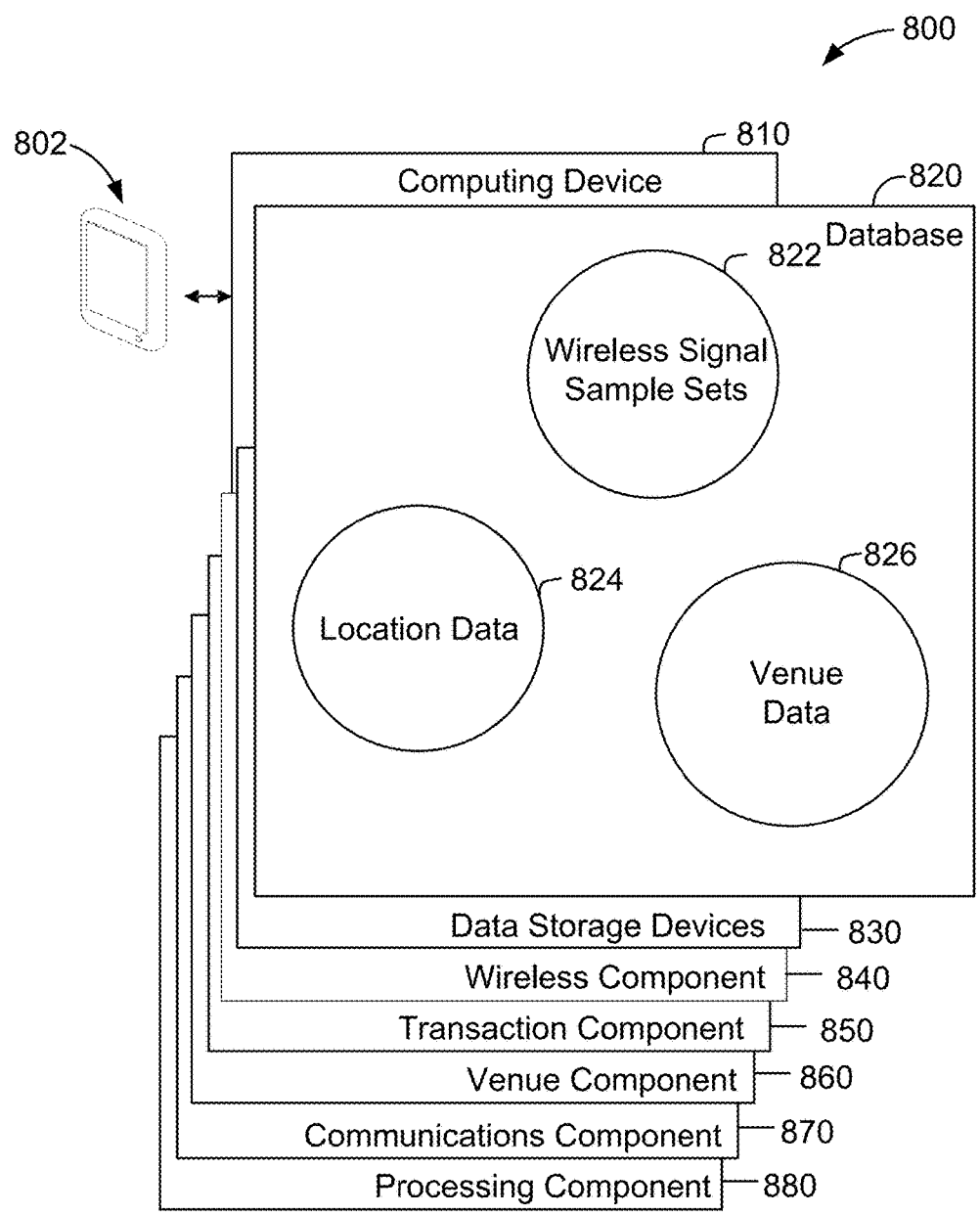

FIG. 8 shows an example configuration 800 of a database 820 within a computing device 810, along with other related computing components, that may be used to provide position determination of a user device 802 (which may be similar to mobile computing device 105, shown in FIG. 1) within a venue based at least in part on wireless signal data and payment card transactions. In some embodiments, computing device 810 is similar to payment processor 112 (shown in FIG. 1), wireless positioning system (WPS) 110 (shown in FIG. 1), and/or server system 301 (shown in FIG. 4). Database 820 is coupled to several separate components within computing device 810, which perform specific tasks.

In the example embodiment, database 820 includes wireless signal sample sets 822, location data 824, and venue data 826. In some embodiments, database 820 is similar to database 120 (shown in FIG. 1). Wireless signal sample sets 822 include information associated with signal strength samples and device information. Location data 824 includes information associated with locations of payment card transactions and point-of-sale devices. Venue data 826 includes data associated with, for example, venue 600 (shown in FIGS. 5 and 6), such as venue map 650.

Computing device 810 includes the database 820, as well as data storage devices 830. Computing device 810 also includes a wireless component 840 for receiving signal strength data of wireless access points. Computing device 810 also includes a transaction component 850 for correlating the locations of payment card transactions with particular point-of-sale (POS) devices and cardholders, and for matching or associating a device ID with a cardholder PAN. A venue component 860 is also included for determining POS device locations within a particular venue. A communications component 870 provides communications functionality enabling computing device 810 to communicate with other computing components. A processing component 880 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for determining device location of a user device within an indoor venue, the method implemented using a wireless positioning system including a processor and a memory, the method comprising:
    generating a plurality of signal sample sets, wherein each signal sample set of the plurality of signal sample sets includes a respective sample location within the indoor venue and one or more wireless signal strengths of associated wireless access points positioned at the indoor venue, wherein each signal sample set of the plurality of signal sample sets is generated by:
        receiving notification of a payment card transaction of a cardholder conducted at a point-of-sale (POS) device at the indoor venue, the notification identifying a sample location of the POS device and a time of the payment card transaction;
        querying a plurality of wireless access points in respective positions near the location of the POS device for an interrogation signal strength of an interrogation signal generated at a cardholder device associated with the cardholder at the time of the payment card transaction;
        building a signal strength sample set representing the respective interrogation signal strengths at each wireless access point of the plurality of wireless access points; and
        associating the signal strength sample set with the sample location of the POS device;
    receiving one or more subject wireless signal strength samples of the wireless access points captured by the user device at an unidentified location within the indoor venue;
    determining, by the processor, a subject location of the user device within the indoor venue based at least in part on the plurality of signal sample sets and the one or more subject wireless signal strength samples; and
    providing the subject location of the user device within the indoor venue.

2. The method of claim 1 further comprising identifying a device ID of the cardholder device, wherein querying a plurality of wireless access points comprises providing the device ID to the plurality of wireless access points in a query.

3. The method of claim 2, wherein identifying a device ID of the cardholder device comprises matching a personal account number (PAN) of a payment account of the cardholder used to conduct the payment card transaction with the device ID of the cardholder device.

4. The method of claim 2, wherein identifying a device ID of the cardholder device comprises:
    generating a geotemporal fingerprint associated with the cardholder based upon a plurality of payment card transaction conducted by the cardholder;
    identifying the cardholder device based upon the geotemporal fingerprint; and
    determining the device ID of the identified cardholder device.

5. The method of claim 1, wherein querying a plurality of wireless access points comprises querying a hub in communication with the plurality of wireless access points and configured to collect signal strength data from the plurality of wireless access points.

6. The method of claim 5 further comprising generating the plurality of signal samples sets in a batch by querying the hub for a respective interrogation signal strength of a respective interrogation signal generated at a respective cardholder device at a respective time for a plurality of payment card transactions conducted within an interval of time at the POS device.

7. The method of claim 1 wherein providing the subject location of the user device within the indoor venue comprises displaying the subject location of the user device using a map application on the user device.

8. A wireless positioning system for determining device location of a user device within an indoor venue, said wireless positioning system comprising a processor communicatively coupled to a memory, said wireless positioning system programmed to:
    generating a plurality of signal sample sets, wherein each signal sample set of the plurality of signal sample sets includes a respective sample location within the indoor venue and one or more wireless signal strengths of associated wireless access points positioned at the indoor venue, wherein to generate the signal sample set of the plurality of signal sample sets, said wireless positioning system is programmed to:
        receive notification of a payment card transaction of a cardholder conducted at a point-of-sale (POS) device at the indoor venue, the notification identifying a sample location of the POS device and a time of the payment card transaction;
        query a plurality of wireless access points in respective positions near the location of the POS device for an interrogation signal strength of an interrogation signal generated at a cardholder device associated with the cardholder at the time of the payment card transaction;

build a signal strength sample set representing the respective interrogation signal strengths at each wireless access point of the plurality of wireless access points; and associate the signal strength sample set with the sample location of the POS device;

receive one or more subject wireless signal strength samples of the wireless access points captured by the user device at an unidentified location within the indoor venue;

determine a subject location of the user device within the indoor venue based at least in part on the plurality of signal sample sets and the one or more subject wireless signal strength samples; and provide the subject location of the user device within the indoor venue.

9. The wireless positioning system of claim 8, said wireless positioning system further programmed to:
identify a device ID of the cardholder device; and
query the plurality of wireless access points by providing the device ID to the plurality of wireless access points in a query.

10. The wireless positioning system of claim 9, said wireless positioning system further programmed to match a personal account number (PAN) of a payment account of the cardholder used to conduct the payment card transaction with the device ID of the cardholder device.

11. The wireless positioning system of claim 9, said wireless positioning system further programmed to:
generate a geotemporal fingerprint associated with the cardholder based upon a plurality of payment card transaction conducted by the cardholder;
identify the cardholder device based upon the geotemporal fingerprint; and
determine the device ID of the identified cardholder device.

12. The wireless positioning system of claim 8, said wireless positioning system further programmed to query the plurality of wireless access points by querying a hub in communication with the plurality of wireless access points and configured to collect signal strength data from the plurality of wireless access points.

13. The wireless positioning system of claim 12, said wireless positioning system further programmed to generate the plurality of signal samples sets in a batch by querying the hub for a respective interrogation signal strength of a respective interrogation signal generated at a respective cardholder device at a respective time for a plurality of payment card transactions conducted within an interval of time at the POS device.

14. The wireless positioning system of claim 12, said wireless positioning system further programmed to display the subject location of the user device using a map application on the user device.

15. At least one non-transitory computer-readable storage media having computer-executable instructions embodied thereon, wherein when executed by at least one processor, the computer-executable instructions cause the processor to:
generating a plurality of signal sample sets, wherein each signal sample set of the plurality of signal sample sets includes a respective sample location within an indoor venue and one or more wireless signal strengths of associated wireless access points positioned at the indoor venue, wherein to generate the signal sample set of the plurality of signal sample sets, the computer-executable instructions cause the processor to:

receive notification of a payment card transaction of a cardholder conducted at a point-of-sale (POS) device at the indoor venue, the notification identifying a sample location of the POS device and a time of the payment card transaction;

query a plurality of wireless access points in respective positions near the location of the POS device for an interrogation signal strength of an interrogation signal generated at a cardholder device associated with the cardholder at the time of the payment card transaction;

build a signal strength sample set representing the respective interrogation signal strengths at each wireless access point of the plurality of wireless access points; and associate the signal strength sample set with the sample location of the POS device;

receive one or more subject wireless signal strength samples of the wireless access points captured by a user device at an unidentified location within the indoor venue;

determine a subject location of the user device within the indoor venue based at least in part on the plurality of signal sample sets and the one or more subject wireless signal strength samples; and provide the subject location of the user device within the indoor venue.

16. The computer-readable storage media of claim 15, wherein the computer-executable instructions further cause the processor to:
identify a device ID of the cardholder device; and
query the plurality of wireless access points by providing the device ID to the plurality of wireless access points in a query.

17. The computer-readable storage media of claim 16, wherein the computer-executable instructions further cause the processor to match a personal account number (PAN) of a payment account of the cardholder used to conduct the payment card transaction with the device ID of the cardholder device.

18. The computer-readable storage media of claim 16, wherein the computer-executable instructions further cause the processor to:
generate a geotemporal fingerprint associated with the cardholder based upon a plurality of payment card transaction conducted by the cardholder;
identify the cardholder device based upon the geotemporal fingerprint; and
determine the device ID of the identified cardholder device.

19. The computer-readable storage media of claim 15, wherein the computer-executable instructions further cause the processor to query the plurality of wireless access points by querying a hub in communication with the plurality of wireless access points and configured to collect signal strength data from the plurality of wireless access points.

20. The computer-readable storage media of claim 15, wherein the computer-executable instructions further cause the processor to display the subject location of the user device using a map application on the user device.

21. A wireless positioning system for determining device location of a user device within an indoor venue, said wireless positioning system comprising a processor communicatively coupled to a memory, said wireless positioning system programmed to:

generate a plurality of signal sample sets, wherein each signal sample set of the plurality of signal sample sets includes a respective sample location within the indoor venue associated with a payment card transaction conducted by a user within the indoor venue, wherein each signal sample set further includes one or more interrogation signal strengths of interrogation signals generated by a user computing device associated with the user at a time of the respective payment transaction and received at a plurality of wireless access points positioned at the indoor venue, the interrogation signal strengths associated with the respective sample location within the indoor venue;

receive one or more subject wireless signal strength samples of the wireless access points captured by the user device at an unidentified location within the indoor venue;

determine a subject location of the user device within the indoor venue based at least in part on the plurality of signal sample sets and the one or more subject wireless signal strength samples; and provide the subject location of the user device within the indoor venue.

\* \* \* \* \*